US011363307B2

(12) United States Patent
Chen et al.

(10) Patent No.: US 11,363,307 B2
(45) Date of Patent: Jun. 14, 2022

(54) VIDEO CODING WITH SUBPICTURES

(71) Applicant: MediaTek Singapore Pte. Ltd., Singapore (SG)

(72) Inventors: Lulin Chen, San Jose, CA (US); Chih-Wei Hsu, Hsinchu (TW); Yu-Wen Huang, Hsinchu (TW)

(73) Assignee: HFI Innovation Inc., Zhubei (TW)

( * ) Notice: Subject to any disclaimer, the term of this patent is extended or adjusted under 35 U.S.C. 154(b) by 0 days.

(21) Appl. No.: 16/984,818

(22) Filed: Aug. 4, 2020

(65) Prior Publication Data

US 2021/0044838 A1 Feb. 11, 2021

Related U.S. Application Data

(60) Provisional application No. 62/889,068, filed on Aug. 20, 2019, provisional application No. 62/884,206, filed on Aug. 8, 2019.

(51) Int. Cl.
*H04N 19/96* (2014.01)
*H04N 19/184* (2014.01)
*H04N 19/119* (2014.01)
*H04N 19/70* (2014.01)

(52) U.S. Cl.
CPC .......... *H04N 19/96* (2014.11); *H04N 19/119* (2014.11); *H04N 19/184* (2014.11); *H04N 19/70* (2014.11)

(58) Field of Classification Search
CPC ...... H04N 19/96; H04N 19/119; H04N 19/70; H04N 19/184
See application file for complete search history.

(56) References Cited

U.S. PATENT DOCUMENTS

| | | | | |
|---|---|---|---|---|
| 2014/0301463 | A1* | 10/2014 | Rusanovskyy | H04N 19/39 375/240.14 |
| 2015/0110118 | A1* | 4/2015 | Ouedraogo | H04L 65/601 370/394 |
| 2017/0289556 | A1* | 10/2017 | Hendry | H04N 19/30 |
| 2017/0324981 | A1* | 11/2017 | Deshpande | H04N 19/597 |
| 2019/0082178 | A1* | 3/2019 | Kim | H04N 19/70 |
| 2019/0158837 | A1* | 5/2019 | Zhang | H04N 19/17 |
| 2020/0294188 | A1* | 9/2020 | Tsukagoshi | H04N 19/50 |

OTHER PUBLICATIONS

Combined Taiwanese Office Action and Search Report dated Aug. 13, 2021 in corresponding Taiwanese Patent Application No. 109126646 (with English Translation of Category of Cited Documents), 12 pages.

* cited by examiner

*Primary Examiner* — Neil R Mikeska
(74) *Attorney, Agent, or Firm* — Oblon, McClelland, Maier & Neustadt, L.L.P.

(57) ABSTRACT

A method of decoding a video sequence coded with subpictures can include receiving a first syntax element corresponding to a coding tree unit (CTU) size in a bitstream at a decoder, receiving a second syntax element corresponding to whether a picture being partitioned into subpictures, in response to the second syntax element indicating the picture is partitioned into the subpictures, receiving third syntax elements indicating a position and a size of each of the subpictures in the picture based on a unit of the CTU size, and reconstructing one or more of the subpictures based on the position and the size of each of the respective subpictures in the picture.

20 Claims, 8 Drawing Sheets

TABLE 1 (MODIFIED)

| # | seq_parameter_set_rbsp( ) { | Descriptor |
|---|---|---|
| 1 | sps_decoding_parameter_set_id | u(4) |
| 2 | sps_video_parameter_set_id | u(4) |
| 3 | sps_max_sub_layers_minus1 | u(3) |
| 4 | sps_reserved_zero_5bits | u(5) |
| 5 | profile_tier_level( sps_max_sub_layers_minus1 ) | |
| 6 | gdr_enabled_flag | u(1) |
| 7 | sps_seq_parameter_set_id | ue(v) |
| 8 | chroma_format_idc | ue(v) |
| 9 | if( chroma_format_idc == 3 ) | |
| 10 | separate_colour_plane_flag | u(1) |
| 11 | pic_width_max_in_luma_samples | ue(v) |
| 12 | pic_height_max_in_luma_samples | ue(v) |
| 13 | subpics_present_flag | u(1) |
| 14 | if( subpics_present_flag ) { | |
| 15 | max_subpics_minus1 | u(8) |
| 16 | subpic_grid_col_width_minus1 | u(v) |
| 17 | subpic_grid_row_height_minus1 | u(v) |
| 18 | for( i = 0; i < NumSubPicGridRows; i++ ) | |
| 19 | for( j = 0; j < NumSubPicGridCols; j++ ) | |
| 20 | subpic_grid_idx[ i ][ j ] | u(v) |
| 21 | for( i = 0; i <= NumSubPics max_subpics_minus1; i++ ) { | |
| 22 | subpic_treated_as_pic_flag[ i ] | u(1) |
| 23 | loop_filter_across_subpic_enabled_flag[ i ] | u(1) |
| 24 | } | |
| 25 | } | |
| 26 | bit_depth_luma_minus8 | ue(v) |
| 27 | bit_depth_chroma_minus8 | ue(v) |
| 28 | min_qp_prime_ts_minus4 | ue(v) |
| 29 | log2_max_pic_order_cnt_lsb_minus4 | ue(v) |
| 30 | if( sps_max_sub_layers_minus1 > 0 ) | |
| 31 | sps_sub_layer_ordering_info_present_flag | u(1) |
| 32 | ... | |
| 33 | if( ChromaArrayType != 0 ) | |
| 34 | qtbtt_dual_tree_intra_flag | u(1) |
| 35 | log2_ctu_size_minus5 | u(2) |
| 36 | log2_min_luma_coding_block_size_minus2 | ue(v) |
| 37 | ... | |
| 38 | } | |

*FIG.10*

VIDEO CODING WITH SUBPICTURES

INCORPORATION BY REFERENCE

This present application claims the benefit of U.S. Provisional Application No. 62/884,206, "Method of Signaling Subpicture Grid" filed on Aug. 8, 2019, and No. 62/889,068, "Method of Specifying the Association of Subpicture with Slices" filed Aug. 20, 2019, which are incorporated herein by reference in their entirety.

TECHNICAL FIELD

The present disclosure relates to video coding with sub-picture-related techniques.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Versatile Video Coding (VVC) has been designed to achieve significantly improved compression capability compared to previous video coding standards, such as High Efficiency Video Coding (HEVC), and to be highly versatile for effective use in a broadened range of applications. For example, some key application areas include video for immersive media applications such as 360° omnidirectional video, and ultra-high-definition video (e.g. 4K or 8K resolution).

SUMMARY

Aspects of the disclosure provide a method of decoding a video sequence coded with subpictures. The method can include receiving a first syntax element indicating a coding tree unit (CTU) size in a bitstream at a decoder, receiving a second syntax element corresponding to whether a picture is partitioned into subpictures, in response to the second syntax element corresponding to the picture being partitioned into the subpictures, receiving third syntax elements indicating a position and a size of each of the subpictures in the picture based on a unit of the CTU size, and reconstructing one or more of the subpictures based on the position and the size of each of the respective subpictures in the picture.

In an embodiment, the first or second syntax element is included in a sequence parameter set (SPS) or a picture parameter set (PPS). In an embodiment, the third syntax elements include subpicture indices associated with respective grid elements of a grid partitioning the picture, the grid elements associated with a same index of the subpicture indices collectively forming one of the subpictures, a size of the grid elements being specified with a unit of a CTU size or a unit of 8 samples.

An embodiment of the method can further include receiving a fourth syntax element in a slice header of a slice in the picture indicating a subpicture identifier (ID) of one of the subpictures that contains the slice. Another embodiment of the method can further include receiving a flag indicating whether the picture includes a single tile in a PPS or an SPS, and in response to the picture including a single tile, determining the picture includes a single slice.

In an embodiment, for each slice in the picture, a subpicture ID associated with each slice in a PPS or an SPS. In an embodiment, syntax elements indicating a layout of slices in the picture can be received. A subpicture ID for each of the slices in the picture can further be received. The position, the size, or a subpicture ID of each of the subpictures in the picture can be determined based on the received syntax elements indicating the layout of the slices in the picture and the received subpicture ID for each of the slices in the picture. In an example, the syntax elements indicating the layout of slices in the picture, or the subpicture ID for each of the slices in the picture are received in an SPS or a PPS.

Aspects of the disclosure provide an apparatus comprising circuitry. The circuitry can be configured to receive a first syntax element indicating a coding tree unit (CTU) size in a bitstream at a decoder, receive a second syntax element corresponding to whether a picture is partitioned into subpictures, in response to the second syntax element corresponding to the picture being partitioned into the subpictures, receive third syntax elements indicating a position and a size of each of the subpictures in the picture based on a unit of the CTU size, and reconstruct one or more of the subpictures based on the position and the size of each of the respective subpictures in the picture.

Aspects of the disclosure provide a non-transitory computer-readable medium storing instructions that, when executed by a processor, cause the processor to perform the method of decoding the video sequence coded with the subpictures.

BRIEF DESCRIPTION OF THE DRAWINGS

Various embodiments of this disclosure that are proposed as examples will be described in detail with reference to the following figures, wherein like numerals reference like elements, and wherein:

FIG. 10 shows syntax of a sequence parameter set (SPS) in Table 1 that is modified to remove signaling of syntax elements subpic_grid_col_width_minus1, subpic_grid_row_height_minus1, and subpic_grid_idx from rows 16-20.

DETAILED DESCRIPTION OF EMBODIMENTS

I. Video Coding Encoder and Decoder

Figure 1:
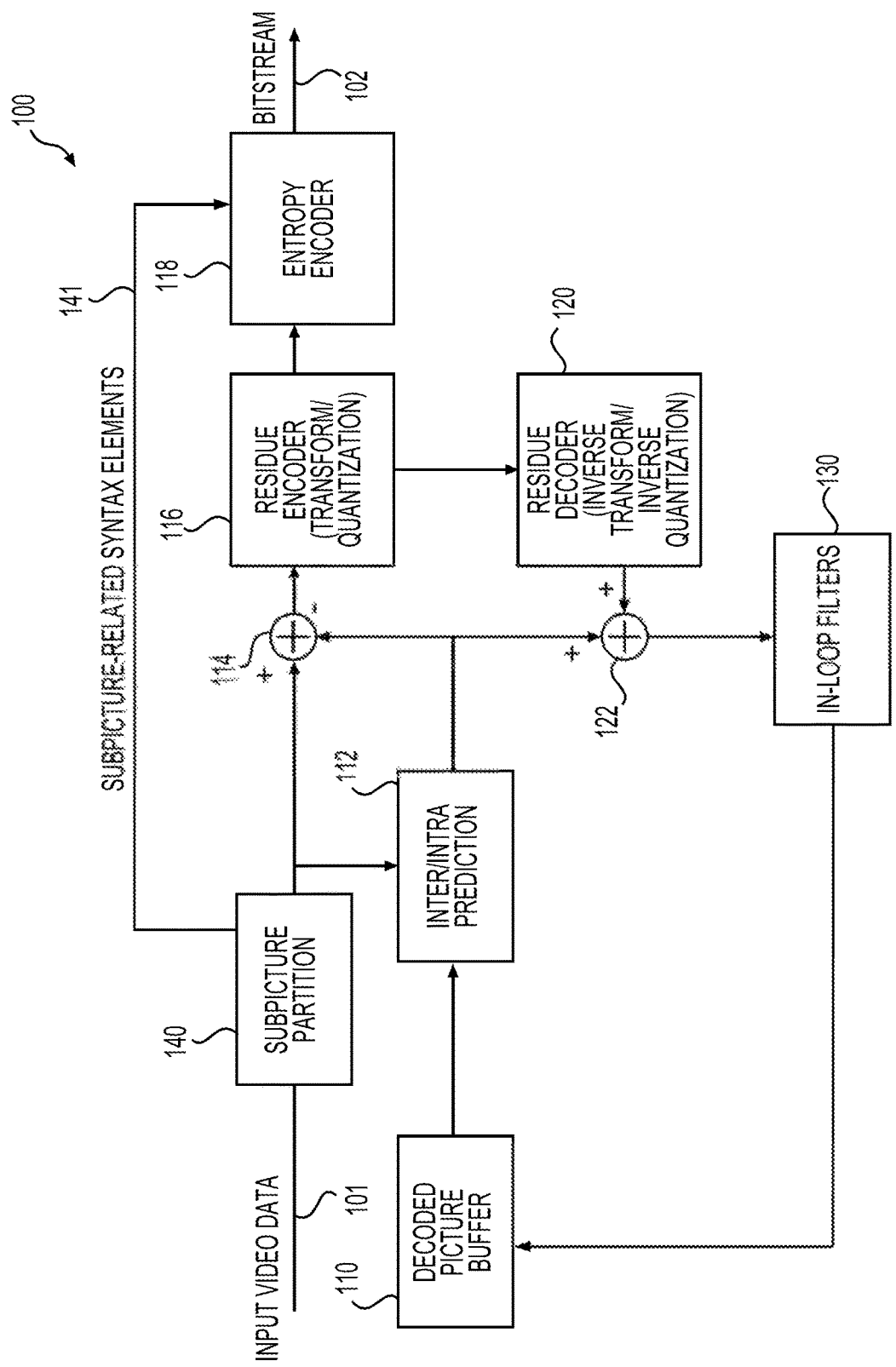
FIG. 1 shows an encoder 100 according to an embodiment of the disclosure.

FIG. 1 shows an encoder 100 according to an embodiment of the disclosure. The encoder 100 can include a decoded picture buffer 110, a subpicture partition module 140, an inter/intra prediction module 112, a first adder 114, a residue encoder 116, an entropy encoder 118, a residue decoder 120, a second adder 122, and one or more in-loop filters 130, such as a deblocking filter, a sample adaptive offset (SAO) filter, and/or an adaptive loop filter (ALF). Those components can be coupled together as shown in FIG. 1.

The encoder 100 receives input video data 101 and performs a video compression process to generate a bitstream 102 as an output. The input video data 101 can include a sequence of pictures. Each picture can include one or more color components, such as a luma component or a chroma component. A current picture (a picture currently under processing) can be divided into multiple coding units (CUs) with a same or different size for inter or intra prediction operations. The bitstream 102 can have a format compliant with a video coding standard, such as the Advanced Video Coding (AVC) standard, High Efficiency Video Coding (HEVC) standard, Versatile Video Coding (VVC) standard, and the like.

In some embodiments, the encoder 100 (e.g., the subpicture partition module 140 in coordination with other modules) can be configured to employ subpicture coding techniques to process the input video data 101. For example, the input video data 101 can be a video for immersive media applications such as a 360-degree omnidirectional video. A user watching a streaming of a 360-degree video may look at a certain part of a 360-degree view at a given time. Accordingly, the subpicture coding techniques can be used to enable a decoder to extract and decode a specific region of the 360-degree view corresponding to the preferred viewing direction instead of decoding the whole video stream. In another example, the input video data 101 can be a high resolution video (e.g., 4K or 8K resolution). By partitioning a high resolution picture into independent subpictures, a decoder with only 2K (e.g., 1080p) capability can handle the high resolution picture by sequentially decoding the subpictures.

In various embodiments, the subpicture partition module 140 can be configured to partition each picture in a video sequence into subpictures. In addition, the subpicture partition module 140 can control other functional modules to process the pictures in the video sequence on the subpicture-by-subpicture basis. For example, the subpictures can each be treated as an independent picture while being encoded. For example, the subpicture partition module 140 can command the in-loop filters 130 to filter the subpictures independently or interdependently. Further, the subpicture partition module 140 can generating syntax elements 141 for subpicture coding control, and provide the syntax elements 141 to the entropy encoder 118 for transmission in the bitstream 102. For example, the syntax elements 141 can indicate whether and how the pictures are partitioned into subpictures.

In FIG. 1, the decoded picture buffer 110 is configured to store reference pictures that are useful for motion estimation and motion compensation performed at the inter/intra prediction module 112. The inter/intra prediction module 112 performs inter picture prediction or intra picture prediction to determine a prediction for a block of a current picture during the video compression process. The prediction of the block is provided to the first and second adders 114 and 122.

The first adder 114 receives a prediction of a block from the inter/intra prediction module 112 and original pixels of the block from the input video data 101. The adder 114 then subtracts the prediction from the original pixel values of the block to obtain a residue of the block. The residue of the block is transmitted to the residue encoder 116.

The residue encoder 116 receives residues of blocks, and compresses the residues to generate compressed residues. For example, the residue encoder 116 may first apply a transform, such as a discrete cosine transform (DCT), discrete sine transform (DST), wavelet transform, and the like, to the received residues corresponding to a transform block and generate transform coefficients of the transform block. Partition of a picture into transform blocks can be the same as or different from partition of the picture into prediction blocks for inter/intra prediction processing.

Subsequently, the residue encoder 116 can quantize the coefficients to compress the residues. The quantization can be controlled with a quantization parameter (QP). A QP indicates a step size for associating the transform coefficients with a finite set of steps.

The residue decoder 120 receives the compressed residues and performs an inverse process of the quantization and transformation operations performed at the residue encoder 116 to reconstruct residues of a transform block. Due to the quantization operation, the reconstructed residues are similar to the original residues generated from the adder 114 but typically are not the same as the original version.

The second adder 122 receives predictions of blocks from the inter/intra prediction module 112 and reconstructed residues of transform blocks from the residue decoder 120. The second adder 122 subsequently combines the reconstructed residues with the received predictions corresponding to a same region in the picture to generate reconstructed video data. The reconstructed video data can then, for example, be transferred to the in-loop filters 130.

As described, the filtering processing at the in-loop filters 130 can be performed independently or interdependently between different subpictures depending on requirement of specific video applications. The in-loop filters 130 can include a deblocking filter that applies a set of low-pass filters to block boundaries to reduce blocking artifacts. The filters can be applied based on characteristics of reconstructed samples on both sides of block boundaries in a reconstructed picture as well as coding parameters (intra or inter coding modes, MVs, and QPs) determined at the inter/intra prediction module 112 or the residue encoder 116 in one example.

The in-loop filters 130 can include an SAO filter and/or an ALF. For example, the SAO filter receives the deblocked reconstructed video data from the deblocking filter and categorizes pixels in the reconstructed video data into groups. The SAO filter can then determine an intensity shift (offset value) for each group to compensate intensity shifts of each group. The shifted reconstructed video data can then be provided from the SAO filter to the ALF. In one example, the ALF is configured to apply a filter to reconstructed video data to reduce coding artifacts in the temporal domain. For example, the ALF selects a filter from a set of filter candidates and applies the elected filter to a region of the reconstructed video data. The processed reconstructed video data can then be transmitted to the decoded picture buffer 110.

The entropy encoder 118 receives the syntax elements 141 for subpicture coding control, and the compressed residues from the residue encoder 116. The entropy encoder 118 may also receive other parameters and/or control information, such as intra prediction mode information, motion information, quantization parameters, control information from the in-loop filters, and the like. The entropy encoder 118 encodes the received parameters or other information to form the bitstream 102. The bitstream 102 including data in a compressed format can be transmitted to a decoder via a communication network, or transmitted to a storage device (e.g., a non-volatile computer-readable medium) where video data carried by the bitstream 102 can be stored.

Figure 2:
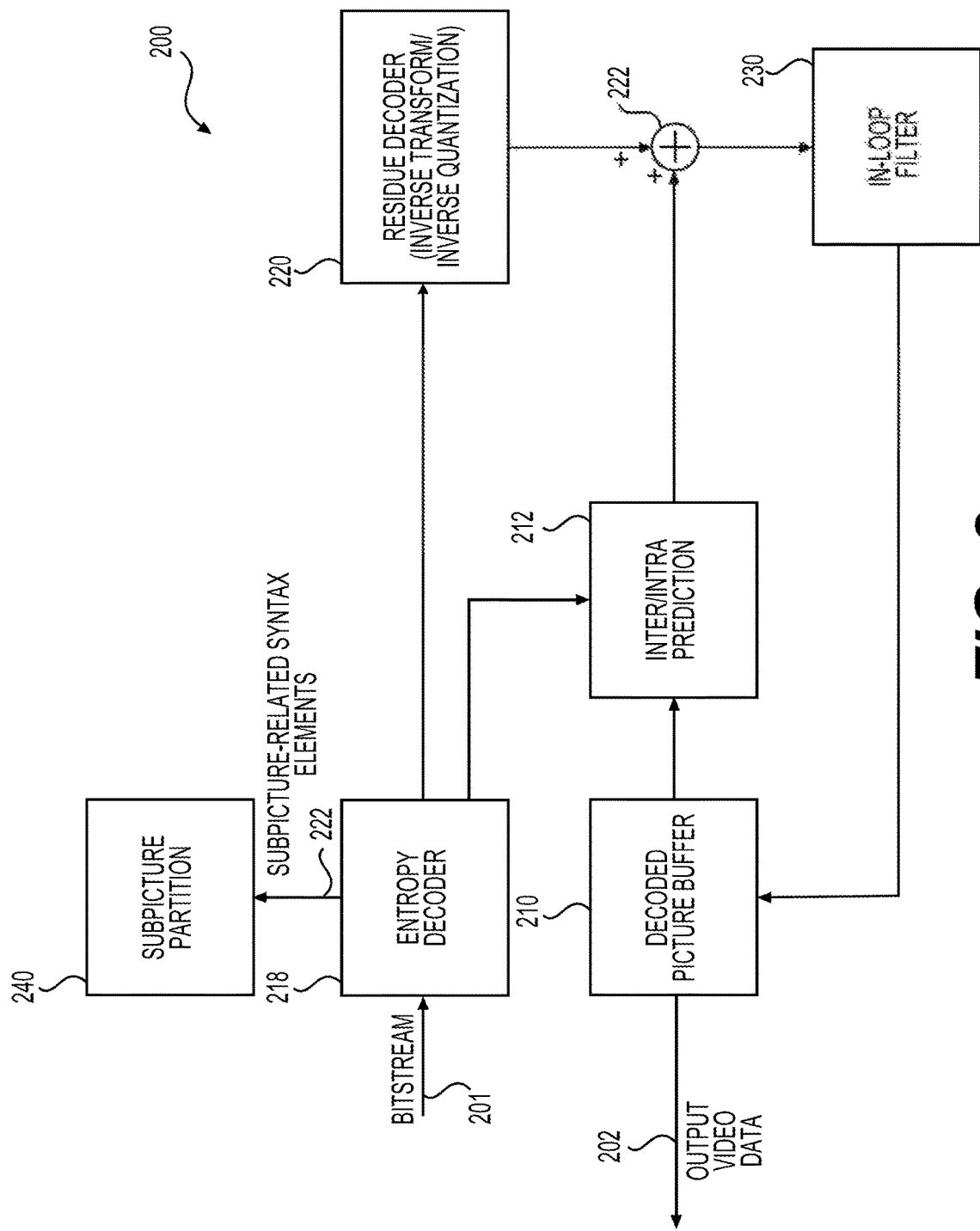
FIG. 2 shows a decoder 200 according to an embodiment of the disclosure.

FIG. 2 shows a decoder 200 according to an embodiment of the disclosure. The decoder 200 includes an entropy decoder 218, a subpicture partition module 240, a residue decoder 220, a decoded picture buffer 210, an inter/intra prediction module 212, an adder 222, and one or more in-loop filters 230, such as a deblocking filter, an SAO filter, and/or an ALF. Those components are coupled together as shown in FIG. 2. In one example, the decoder 200 receives a bitstream 201 generated by an encoder, such as the bitstream 102 generated by the encoder 100, and performs a decompression process to generate output video data 202. The output video data 202 can include a sequence of pictures that can be displayed, for example, on a display device, such as a monitor, a touch screen, and the like.

In various embodiment, the decoder 200 (e.g. the subpicture partition module 240 in coordination with other modules) can be configured to implement subpicture coding techniques to process an encoded video sequence including subpictures. For example, the subpicture partition module 240 can receive subpicture-related syntax elements 241, and accordingly control other modules in the decoder 200 to perform subpicture-based decoding operations.

In an embodiment, the subpicture partition module 240 can receive and interpret the subpicture-related syntax elements 241 to obtain subpicture partition information. For example, the subpicture partition module 240 can determine a layout (positions and sizes) of subpictures in a picture, and matching regions of subpictures to respective slices. In some applications, based on the subpicture partition information, the subpicture partition module 240, in coordination with the entropy decoder 218, can extract coded data of a subset of subpictures in the video sequence from the bitstream 201, and provide respective syntax elements to other modules (e.g., the inter/intra prediction module 212, or the residue decoder 220) for decoding processing. In addition, based on an indication of the subpicture-related syntax elements 241, the subpicture partition module 240 can control the in-loop filter 230 to perform independent or interdependent filtering processing between different subpictures.

In FIG. 2, the entropy decoder 218 receives the bitstream 201 and performs a decoding process which is an inverse process of the encoding process performed by the entropy encoder 118 in FIG. 1 example. As a result, compressed subpicture-related syntax elements, residues, prediction parameters (intra mode information, and motion information), in-loop filter control information, and the like, are obtained. The compressed residues are provided to the residue decoder 220, and the prediction parameters are provided to the inter/intra prediction module 212. The inter/intra prediction module 212 generates predictions of blocks of a picture based on the received prediction parameters, and provides the predictions to the adder 222. The decoded picture buffer 210 stores reference pictures useful for motion compensation performed at the inter/intra prediction module 212. The reference pictures, for example, can be received from the in-loop filters 230. In addition, reference pictures are obtained from the decoded picture buffer 210 and included in the picture video data 202 for displaying to a display device.

The residue decoder 220, the adder 222, and the in-loop filters 230 are similar to the residue decoder 120, the second adder 122, the in-loop filters 130 in terms of functions and structures.

In various embodiments, the encoder 100 and the decoder 200, or various modules or functions of the encoder 100 and decoder 200, can be implemented with hardware, software, or combination thereof. For example, the encoder 100 or the decoder 200 can be implemented with one or more integrated circuits (ICs), such as an application specific integrated circuit (ASIC), field programmable gate array (FPGA), and the like. For another example, the encoder 100 or the decoder 200 can be implemented as software or firmware including instructions stored in a computer readable non-transitory storage medium. The instructions, when executed by a processing circuit, causing the processing circuit to perform functions of the encoder 100 or the decoder 200.

It is noted that subpicture processing techniques described herein can be included in other decoders or encoders that may have similar or different structures from the encoder 100 or decoder 200. In addition, the encoder 100 and decoder 200 can be included in a same device, or separate devices in various examples.

II. Subpicture Processing Techniques

1. Partitioning Pictures into Subpictures

In an embodiment, a picture can be divided into one or more tile rows and one or more tile columns. A tile can be a sequence of coding tree units (CTUs) that covers a rectangular region of a picture. The CTUs in a tile can be scanned in a raster scan order within that tile. For example, a CTU can be associated with three coding tree blocks (CTBs) (luma and chroma), related coding tree syntax structures, and associated coding units. A sample array size for each luma CTB in both width and height can be denoted by CtbSizeY in units of samples. A width and a height of the sample array for each chroma CTB can be denoted CtbWidthC and CtbHeightC, respectively, in units of samples.

A tile can be divided into one or more bricks. Each of the bricks can include a number of CTU rows within the tile. A tile that is not partitioned into multiple bricks can also be referred to as a brick. A brick that is a true subset of a tile is not referred to as a tile.

A slice can include an integer number of complete tiles or an integer number of consecutive complete CTU rows within a tile of a picture. Consequently, each vertical slice boundary can be also a vertical tile boundary. It is possible that a horizontal boundary of a slice is not a tile boundary but includes horizontal CTU boundaries within a tile, which can occur when a tile is split into multiple rectangular slices, each of which includes an integer number of consecutive complete CTU rows within the tile. A slice either contains a number of tiles of a picture or a number of bricks of a tile.

In an embodiment, two modes of slices can be supported, namely a raster-scan slice mode and a rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice can be scanned in tile raster scan order within the rectangular region corresponding to that slice in an example.

In an embodiment, a subpicture can include one or more slices that collectively cover a rectangular region of a picture. Consequently, each subpicture boundary can also be a slice boundary, and each vertical subpicture boundary can also be a vertical tile boundary. In addition, in an example, for partitioning subpictures, both or either of the following two conditions are satisfied, all CTUs in a subpicture belong to the same tile, or all CTUs in a tile belong to the same subpicture.

Figure 3:
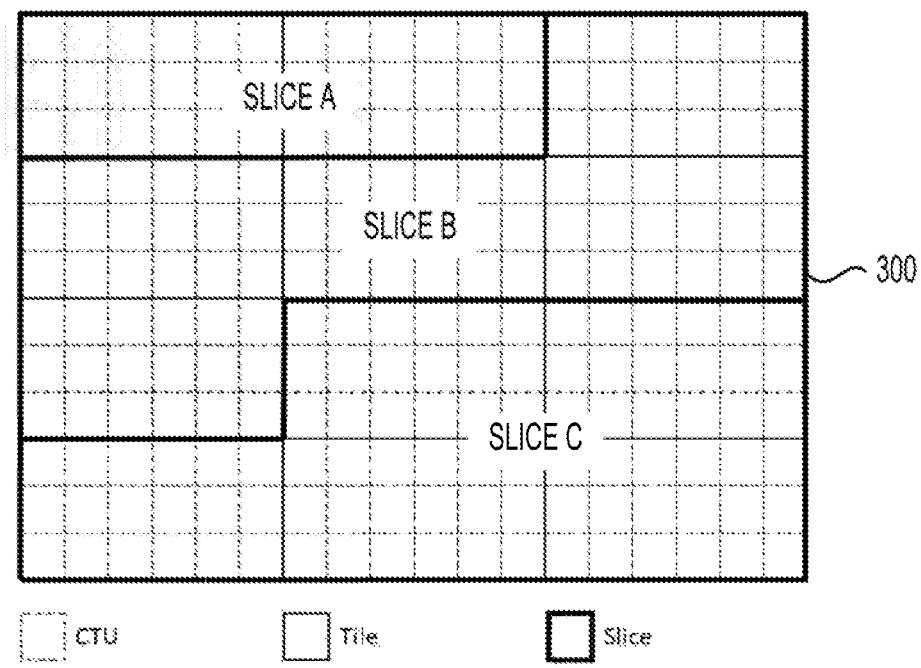
FIG. 3 shows an example of raster-scan slice partitioning of a picture 300.

FIG. 3 shows an example of raster-scan slice partitioning of a picture 300. The picture 300 is divided into 12 tiles (3 tile columns and 4 tile rows) and 3 raster-scan slices A-C including 2, 5, and 5 tiles, respectively.

Figure 4:
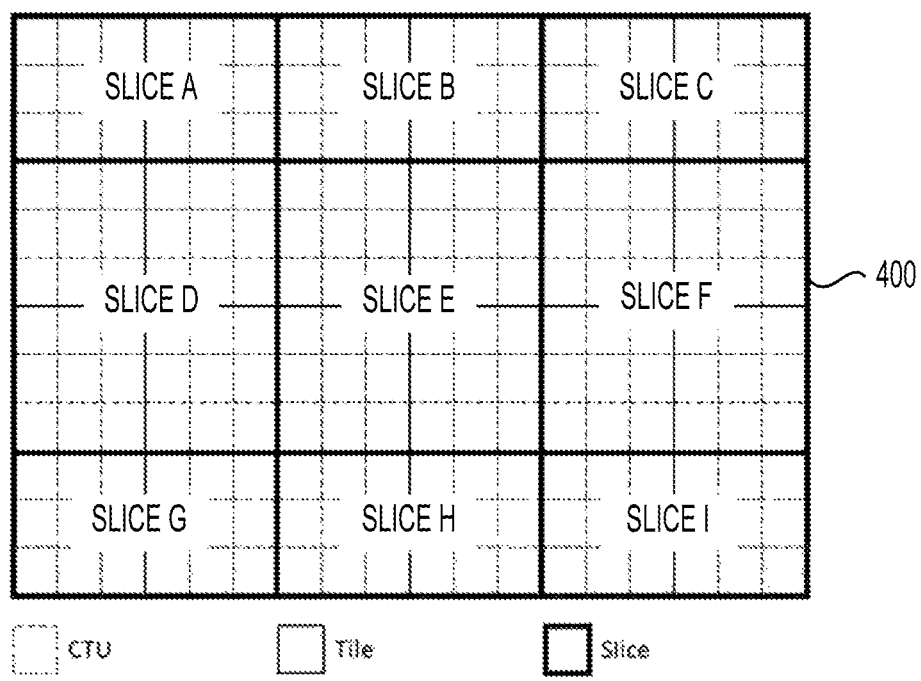
FIG. 4 shows an example of rectangular slice partitioning of a picture 400.

FIG. 4 shows an example of rectangular slice partitioning of a picture 400. The picture 400 is divided into 24 tiles (6 tile columns and 4 tile rows) and 9 rectangular slices A-I including 2, 2, 2, 4, 4, 4, 2, 2, and 2 slices, respectively.

Figure 5:
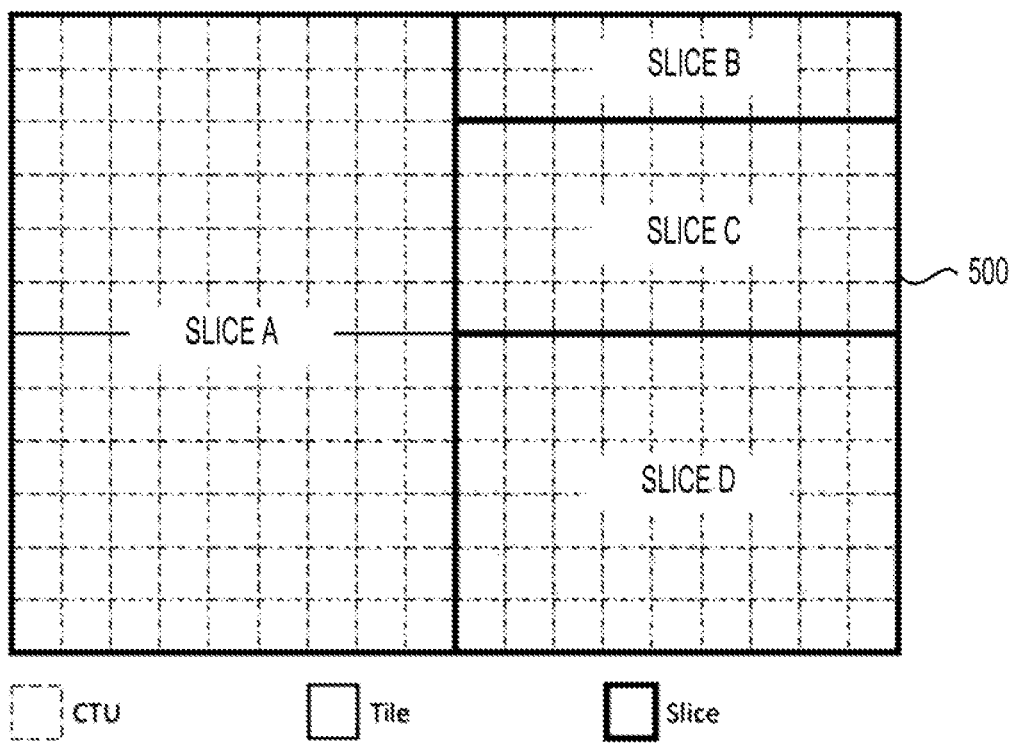
FIG. 5 shows an example of a picture 500 partitioned into tiles and rectangular slices A-D.

FIG. 5 shows an example of a picture 500 partitioned into tiles and rectangular slices A-D. The picture 500 is divided into 4 equal-sized tiles (2 tile columns and 2 tile rows) and 4 rectangular slices A-D. Slice A includes two tiles, while slice B and slice C are included in a same tile.

Figure 6:
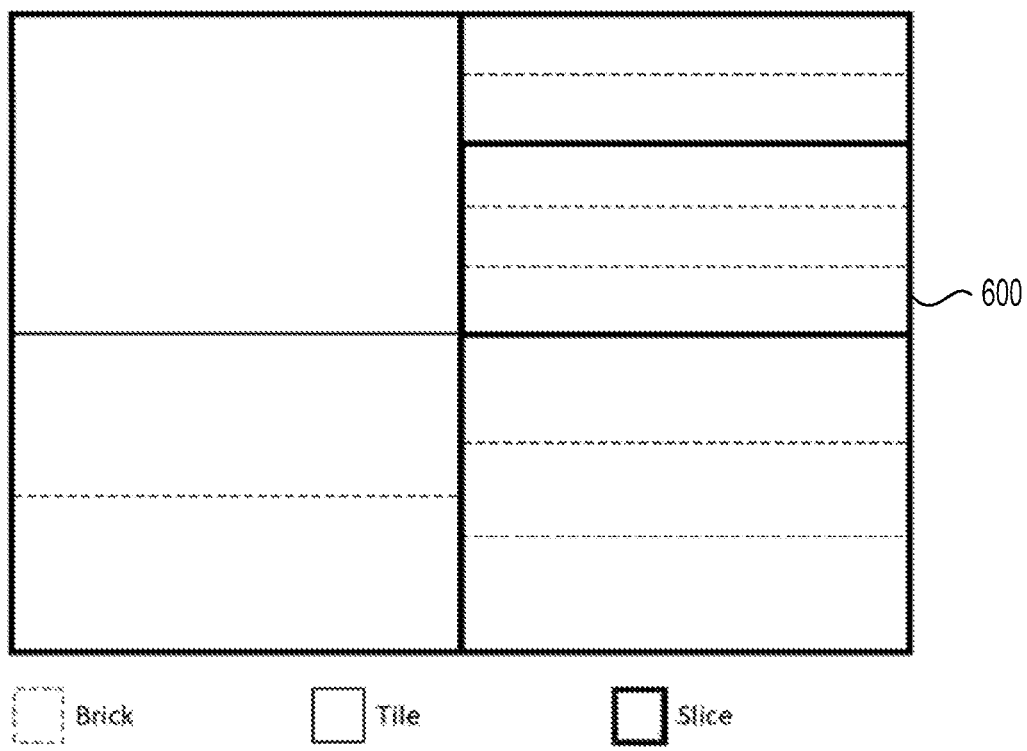
FIG. 6 shows an example of a picture 600 partitioned into tiles, bricks, and rectangular slices.

FIG. 6 shows an example of a picture 600 partitioned into tiles, bricks, and rectangular slices. The picture 600 is divided into 4 tiles (2 tile columns and 2 tile rows), 11 bricks (the top-left tile contains 1 brick, the top-right tile contains 5 bricks, the bottom-left tile contains 2 bricks, and the bottom-right tile contain 3 bricks), and 4 rectangular slices (a slice at the left-hand side, and three slices at the right-hand side).

Figure 7:
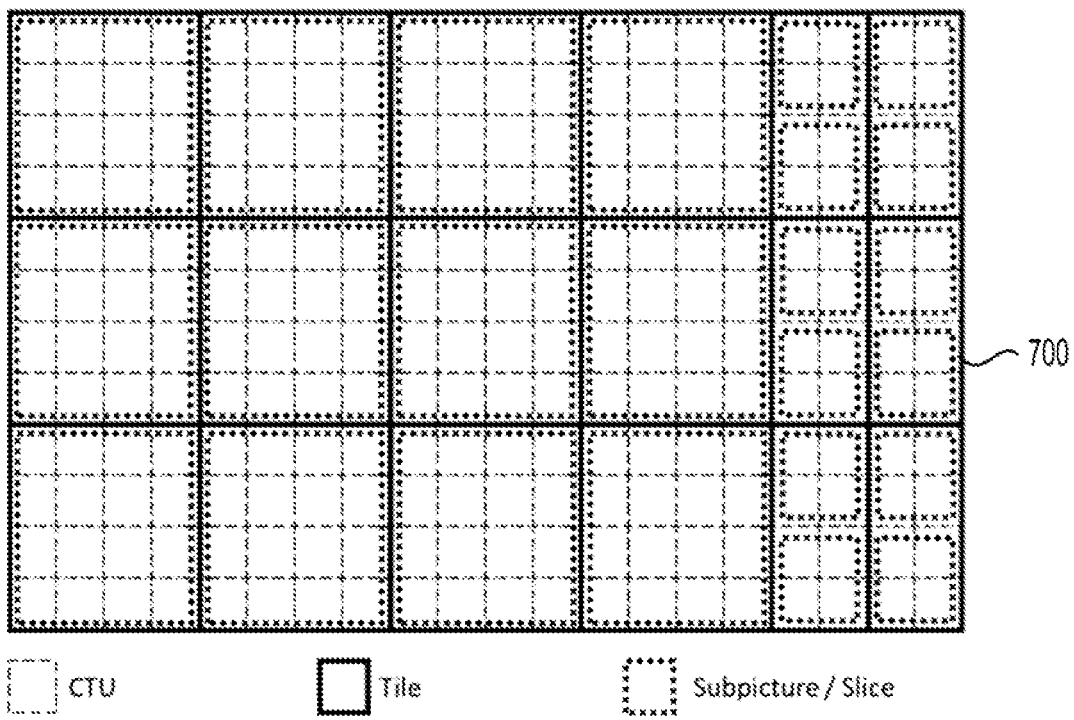
FIG. 7 shows an example of subpicture partitioning of a picture 700.

FIG. 7 shows an example of subpicture partitioning of a picture 700. The picture 700 is partitioned into 18 tiles in which 12 tiles on the left-hand side each covers one slice of 4 by 4 CTUs and 6 tiles on the right-hand side each covers 2 vertically-stacked slices of 2 by 2 CTUs. As a result, 24 slices and 24 subpictures of varying dimensions are formed (each slice is a subpicture).

Figure 8:
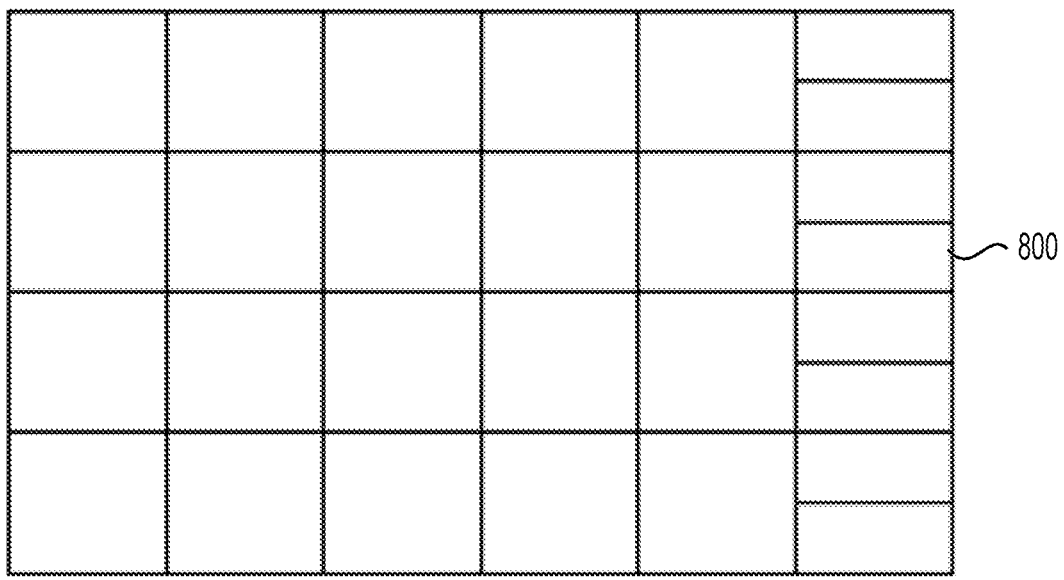
FIG. 8 shows an example of subpicture partitioning of a picture 800.

FIG. 8 shows an example of subpicture partitioning of a picture 800. The picture 800 is partitioned into 28 subpictures where 20 subpictures having a square shape are on the left-hand side, and 8 subpicture having a half-square shape are on the right-hand side.

2. Signaling Subpicture Partition Information

Figure 9:
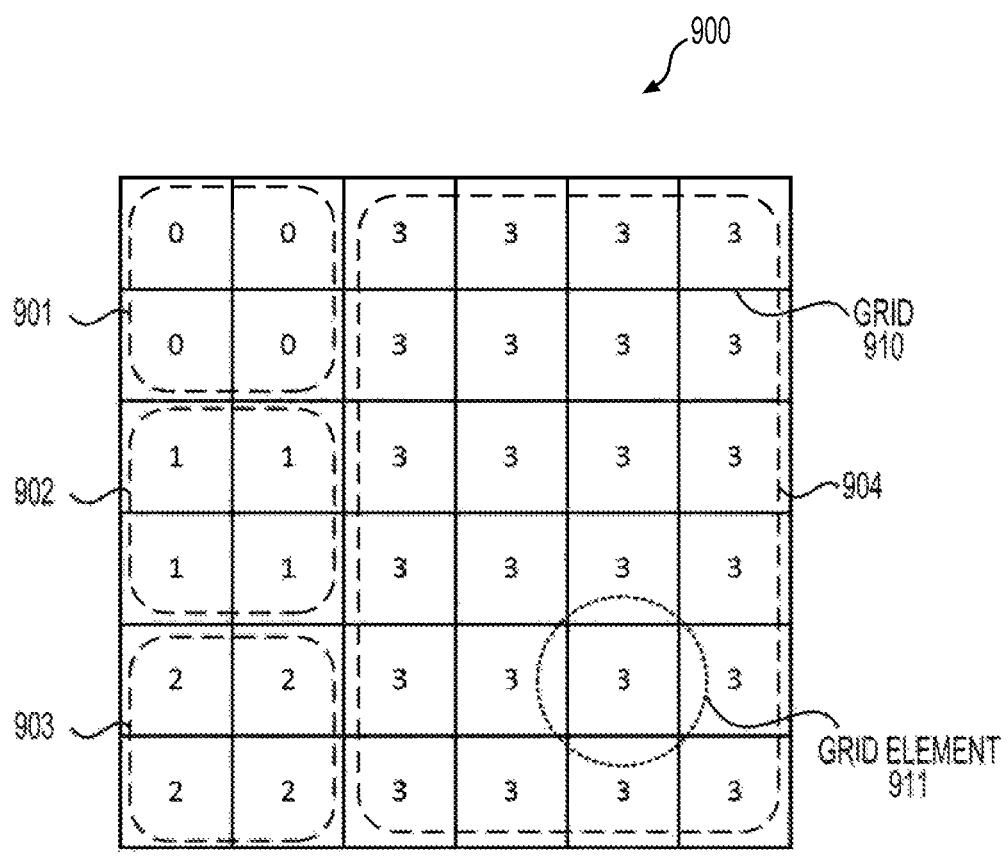
FIG. 9 shows an example of how to signal subpicture partition information based on a grid 910 overlaying a picture 900.

FIG. 9 shows an example of how to signal subpicture partition information based on a grid 910 overlaying a picture 900. The grid 910 can have 6 rows and 6 columns of equal-sized grid elements 911. Each grid element 911 corresponds to a sub-region of the picture 900. Then, each grid element 911 can be assigned a label (referred to as a grid index). Grid elements having a same label collectively define a subpicture. As shown, the grid elements each with a grid index of 0 define a first subpicture 902, while the grid elements with grid indices of 1, 2, or 3 respectively define subpictures 902, 903, and 904. In some examples, the grid index can be mapped with a subpicture identifier (ID). In some examples, a grid index and a corresponding subpicture ID can have a same value.

To signal the subpicture partition information, the following information can be signaled in a bitstream from an encoder to a decoder; a size of the grid element 911, a size of the picture 900, and grid indices of each grid elements 911. Based on those signaled information, the decoder and the encoder can have a same understanding of how the picture 900 is partitioned into the subpictures 901-904.

Example A: Subpicture Signaling Based on Units of 4 Samples

Table 1 below is a syntax table of a sequence parameter set (SPS) referred by a video sequence.

TABLE 1

| # | seq_parameter_set_rbsp( ) { | Descriptor |
|---|---|---|
| 1 | sps_decoding_parameter_set_id | u(4) |
| 2 | sps_video_parameter_set_id | u(4) |
| 3 | sps_max_sub_layer_minus1 | u(3) |
| 4 | sps_reserved_zero_5bits | u(5) |
| 5 | profile_tier_level( sps_max_sub_layers_minus1 ) | |
| 6 | gdr_enabled_flag | u(1) |
| 7 | sps_seq_parameter_set_id | ue(v) |
| 8 | chroma_format_idc | ue(v) |
| 9 | if( chroma_format_idc = = 3 ) | |
| 10 |     separate_colour_plane_flag | u(1) |
| 11 | pic_width_max_in_luma_samples | ue(v) |
| 12 | pic_height_max_in_luma_samples | ue(v) |
| 13 * | subpics_present_flag | u(1) |
| 14 * | if( subpics_present_flag ) { | |
| 15 * |     max_subpics_minus1 | u(8) |
| 16 * |     subpic_grid_col_width_minus1 | u(v) |
| 17 * |     subpic_grid_row_height_minus1 | u(v) |
| 18 * |     for( i = 0; i < NumSubPicGridRows; i++ ) | |
| 19 * |         for( j = 0; j < NumSubPicGridCols; j++ ) | |
| 20 * |             subpic_grid_idx[ i ][ j ] | u(v) |
| 21 * |     for( i = 0; <= NumSubPics; i++ ) { | |
| 22 * |         subpic_treated_as_pic_flag[ i ] | u(1) |
| 23 * |         loop_filter_across_subpic_enabled_flag[ i ] | u(1) |
| 24 |     } | |
| 25 | } | |
| 26 | bit_depth_luma_minus8 | ue(v) |
| 27 | bit_depth_chroma_minus8 | ue(v) |
| 28 | min_qp_prime_ts_minus4 | ue(v) |
| 29 | log2_max_pic_order_cnt_lsb_minus4 | ue(v) |
| 30 | if( sps_max_sub_layers_minus1 > 0 ) | |
| 31 |     sps_sub_layer_ordering_info_present_flag | u(1) |
| 32 | ... | |
| 33 | if( ChromaArrayType != 0 ) | |
| 34 |     qtbtt_dual_tree_intra_flag | u(1) |
| 35 | log2_ctu_size_minus5 | u(2) |
| 36 | log2_min_luma_coding_block_size_minus2 | ue(v) |
| 37 | ... | |
| 38 | } | |

A set of syntax elements and variables for signaling subpicture partition information is included in the SPS of Table 1. Semantics of the related syntax elements and derivation of related variables are explained below pic_width_max_in_luma_samples specifies a maximum width of the pictures in units of a luma sample, while pic_height_max_in_luma_samples specifies a maximum height of the pictures in units of a luma sample.

subpics_present_flag indicates whether subpicture information is present for the sequence of pictures. In some embodiments, subpics_present_flag equal to 1 indicates that subpicture parameters are present in tire present in the SPS RBSP syntax; subpics_present_flag equal to 0 indicates that subpicture parameters are not present in the present in the SPS RBSP syntax. In some other embodiments, subpics_present_flag equal to 1 specifies that subpicture information is present for the video sequence referring the SPS, and there might be one or more than one subpicture in each picture of the video sequence. subpic_present_flag equal to 0 specifies that subpicture information is not present for the video sequence and there is only one subpicture in each picture of the video sequence. In some other embodiments, subpics_present_flag or any other sytax element can be used to indicate or represent information about whether subpicture information is present for the sequence of pictures.

max_subpics_minus1 plus 1 specifies the maximum number of subpictures that may be present in the sequence of pictures, max_subpics_minus1 can be in the range of 0 to 254. The value of 255 is reserved for future use.

subpic_grid_col_width_minus1 plus 1 specifies the width of each element of a subpicture partition grid in units of 4 samples. The length of the syntax element is Ceil(Log 2(pic_width_max_in_luma_samples/4)) bits. In other words, the width of each element is represented to be multiples of 4 samples. For example, a width of 64 samples of a grid element would be 16 units of 4 samples. Accordingly, subpic_grid_col_width_minus1 would have a value of 15.

The variable NumSubPicGridCols indicating a number of subpicture grid columns can be derived as follows:

NumSubPicGridCols=(pic_width_max_in_luma_samples+subpic_grid_col_width_minus1*4+3)/(subpic_grid_col_width_minus1*4+4)

subpic_grid_row_height_minus1 plus 1 specifies the height of each element of the subpicture identifier grid in units of 4 samples. The length of the syntax element is Ceil(Log 2(pic_height_max_in_luma_samples/4)) bits.

The variable NumSubPicGridRows indicating a number of subpicture grid rows is derived as follows.

NumSubPicGridRows=(pic_height_max_in_luma_samples+subpic_grid_row_height_minus1*4+3)/(subpic_grid_row_height_minus1*4+4)

subpic_grid_idx[i][j] specifies the subpicture index of the grid position (i, j). The length of the syntax element is Ceil(Log 2(max_subpics_minus1+1)) bits.

The variables SubPicTop[subpic_grid_idx[i][j]] indicating a vertical (y direction) position of a subpicture with the index subpic_grid_idx[i][j], SubPicLeft[subpic_grid_idx[i][j]] indicating a horizontal (x direction) position of the subpicture with the index subpic_grid_idx[i][j], SubPicWidth[subpic_grid_idx[i][j]] indicating a width of the subpicture with the index subpic_grid_idx[i][j], SubPicHeight[subpic_grid_idx[i][j]] indicating a height of the subpicture with the index subpic_grid_idx[i][j], and NumSubPics indicating a number of subpictures in the respective picture, can be derived as follows:

subpic_treated_as_pic_flag[i] equal to 1 specifies that the i-th subpicture of each coded picture in the video sequence is treated as a picture in the decoding process excluding in-loop filtering operations. subpic_treated_as_pic_flag[i] equal to 0 specifies that the i-th subpicture of each coded picture in the video sequence is not treated as a picture in the decoding process excluding in-loop filtering operations. When not present, the value of subpic_treated_as_pic_flag[i] is inferred to be equal to 0.

loop_filter_across_subpic_enabled_flag[i] equal to 1 specifies that in-loop filtering operations may be performed across the boundaries of the i-th subpicture in each coded picture in the video sequence. loop_filter_across_subpic_enabled_flag[i] equal to 0 specifies that in-loop filtering operations are not performed across the boundaries of the i-th subpicture in each coded picture in the video sequence. When not present, the value of loop_filter_across_subpic_enabled_pic_flag[i] is inferred to be equal to 1.

In an example, it is a requirement of bitstream conformance that the following constraints apply: (1) For any two subpictures subpicA and subpicB, when the index of subpicA is less than the index of subpicB, any coded NAL unit of subPicA shall precede any coded NAL unit of subPicB in decoding order. (b) The shapes of the subpictures shall be such that each subpicture, when decoded, shall have its entire left boundary and entire top boundary consisting of picture boundaries or consisting of boundaries of previously decoded subpictures.

Example B: Subpicture Signaling Based on Units of 8 Samples

In an embodiment, a coded picture size is defined as an integer of multiples of 8 samples. As a subpicture may be extracted as a regular picture, a subpicture size can be an integer of multiples of 8 samples as well. Accordingly, subpicture signaling in an SPS can be based on a grid in units of 8 samples instead of 4 samples.

Corresponding to using 8 samples as a unit for signaling subpicture partition information, in contrast to Example A, semantics of the related syntax elements and derivation of related variables can be modified as follows.

subpic_grid_col_width_minus1 plus 1 specifies the width of each element of the subpicture identifier grid in units of

```
NumSubPics = 0
for( i = 0; i, < NumSubPicGridRows; i++ ) {
    for( j = 0; j, < NumSubPicGridCols; j++ ) {
        if ( i = = 0)
            SubPicTop[ subpic_grid_idx[ i ][ j ] ] = 0
        else if( subpic_grid_idx[ i ][ j ] != subpic_grid_idx[ i - 1 ][ j ] ) {
            SubPicTop[ subpic_grid_idx[ i ][ j ] ] = i
            SubPicHeight[ subpic_grid_idx[ i - 1 ][ j ] ] = i - SubPicTop[ subpic_grid_idx[ i - 1 ][ j ] ]
        }
        if ( j = = 0)
            SubPicLeft[ subpic_grid_idx[ i ][ j ] ] = 0
        else if (subpic_grid_idx[ i ][ j ] != subpic_grid_idx[ i ][ j - 1 ] ) {
            SubPicLeft[ subpic_grid_idx[ i ][ j ] ] = j
            SubPicWidth[ subpic_grid_idx[ i ][ j ] ] = j - SubPicLeft[ subpic_grid_idx[ i ][ j - 1 ] ]
        }
        if ( i = = NumSubPicGridRows - 1)
            SubPicHeight[ subpic_grid_idx[ i ][ j ] ] = i - SubPicTop[ subpic_grid_idx[ i - 1 ][ j ] ] + 1
        if (j = = NumSubPicGridRows - 1)
            SubPicWidth[ subpic_grid_idx[ i ][ j ] ] = j - SubPicLeft[ subpic_grid_idx[ i ][ j - 1 ] ] + 1
        if( subpic_grid_idx[ i ][ j ] > NumSubPics)
            NumSubPics = subpic_grid_idx[ i ][ j ]
    }
}
```

8 samples. The length of the syntax element is Ceil(Log 2(pic_width_max_in_luma_samples/8)) bits.

The variable NumSubPicGridCols is derived as follows:

NumSubPicGridCols=(pic_width_max_in_luma_samples+subpic_grid_col_width_minus1*8+7)/(subpic_grid_col_width_minus1*8+8)

subpic_grid_row_height_minus1 plus 1 specifies the height of each element of the subpicture identifier grid in units of 8 samples. The length of the syntax element is Ceil(Log 2(pic_height_max_in_luma_samples/8)) bits.

The variable NumSubPicGridRows is derived as follows:

NumSubPicGridRows=(pic_height_max_in_luma_samples+subpic_grid_row_height_minus1*8+7)/(subpic_grid_row_height_minus1*8+8)

When a unit of 8 samples are employed for signaling the subpicture partition information, a list CtbToSubPicIdx[ctbAddrRs] for ctbAddrRs ranging from 0 to PicSizeInCtbsY−1, inclusive, specifying the conversion from a CTB address (ctbAddrRs) in picture raster scan to a subpicture index (CtbToSubPicIdx), is derived as follows. By performing the process, a subpicture index is mapped to each CTB.

```
for( ctbAddrRs = 0; ctbAddrRs < PicSizeInCtbsY; ctbAddrRs++ ) {
  posX = ctbAddrRs % PicWidthInCtbsY * CtbSizeY
  posY = ctbAddrRs / PicWidthInCtbsY * CtbSizeY
  CtbToSubPicIdx[ ctbAddrRs ] = −1
  for( i = 0; CtbToSubPicIdx[ ctbAddrRs ] < 0 && i < NumSubPics;
  i++ ) {
    if( ( posX >= SubPicLeft[ i ] * ( subpic_grid_col_width_minus1 +
    1 ) * 8 ) &&
          ( posX < ( SubPicLeft[ i ] + SubPicWidth[ i ] ) *
              ( subpic_grid_col_width_minus1 + 1 ) * 8 )
          &&
      ( posY >= SubPicTop[ i ] *
          ( subpic_grid_row_height_minus1 + 1 ) * 8 ) &&
      ( posY < ( SubPicTop[ i ]+ SubPicHeight[ i ] ) *
              ( subpic_grid_row_height_minus1 + 1 ) * 8 ) )
      CtbToSubPicIdx[ ctbAddrRs ] = i
  }
}
```

It is noted that grid elements in the right-most grid column of a picture may be incomplete and a grid width may be smaller than (subpic_grid_row_width_minus1+1)*8 samples. Grid elements in the bottom grid row of the picture may be incomplete and the grid height may be smaller than (subpic_grid_row_height_minus1+1)*8 samples.

Example C: Subpicture Signaling Based on Units of a CTB Size

In an embodiment, based on the partition methods described in section II.1 where a subpicture size can be defined to be a region covered by a set of CTBs, the subpicture partition information is signaled using a grid defined in units of a CTB size. In other words, a height or a width of each grid element can be represented to be multiples of a CTB size. Accordingly, semantics of related syntax elements and derivation of related variables can be modified.

Table 2 is a syntax table of an SPS in which subpicture partition information is signaled based on units of a CTB size.

TABLE 2

| # | seq_parameter_set_rbsp( ) { | Descriptor |
|---|---|---|
| 1 | sps_decoding_parameter_set_id | u(4) |
| 2 | sps_video_parameter_set_id | u(4) |

TABLE 2-continued

| # | seq_parameter_set_rbsp( ) { | Descriptor |
|---|---|---|
| 3 | sps_max_sub_layer_minus1 | u(3) |
| 4 | sps_reserved_zero_5bits | u(5) |
| 5 | profile_tier_level( sps_max_sub_layers_minus1 ) | |
| 6 | gdr_enabled_flag | u(1) |
| 7 | sps_seq_parameter_set_id | ue(v) |
| 8 | chroma_format_idc | ue(v) |
| 9 | if( chroma_format_idc = = 3 ) | |
| 10 |   separate_colour_plane_flag | u(1) |
| 11 | pic_width_max_in_luma_samples | ue(v) |
| 12 | pic_height_max_in_luma_samples | ue(v) |
| 13 * | log2_ctu_size_minus5 | u(2) |
| 14 * | log2_min_luma_coding_block_size_minus2 | ue(v) |
| 15 * | subpics_present_flag | u(1) |
| 16 * | if( subpics_present_flag ) { | |
| 17 * |   max_subpics_minus1 | u(8) |
| 18 * |   subpic_grid_col_width_minus1 | u(v) |
| 19 * |   subpic_grid_row_height_minus1 | u(v) |
| 20 * |   for( i = 0; i < NumSubPicGridRows; i++ ) | |
| 21 * |     for( j = 0; j < NumSubPicGridCols; j++ ) | |
| 22 * |       subpic_grid_idx[ i ][ j ] | u(v) |
| 23 * |   for( i = 0; <= NumSubPics; i++ ) { | |
| 24 * |     subpic_treated_as_pic_flag[ i ] | u(1) |
| 25 * |     loop_filter_across_subpic_enabled_flag[ i ] | u(1) |
| 26 |   } | |
| 27 | } | |
| 28 | bit_depth_luma_minus8 | ue(v) |
| 29 | bit_depth_chroma_minus8 | ue(v) |
| 30 | min_qp_prime_ts_minus4 | ue(v) |
| 31 | log2_max_pic_order_cnt_lsb_minus4 | ue(v) |
| 32 | if( sps_max_sub_layers_minus1 > 0 ) | |
| 33 |   sps_sub_layer_ordering_info_present_flag | u(1) |
| 34 | ... | |
| 35 | if( ChromaArrayType != 0 ) | |
| 36 |   qtbtt_dual_tree_intra_flag | u(1) |
| 37 | ... | |
| 38 | } | |

At row 13, the syntax element, log 2_ctu_size_minus5, indicating a CTU size in form of a log 2 value minus 5 is signaled. Compared with Table 1, the syntax element of the CTU size is advanced to be positioned before signaling of other subpicture partition related syntax elements at rows 15-25.

Sematics of the related syntax elements and derivation of the related variables are described below.

subpic_grid_col_width_minus1 plus 1 specifies the width of each element of the subpicture identifier grid excluding the right-most grid column of the picture in units of CTBs. The length of the syntax element is Ceil(Log 2(pic_width_max_in_luma_samples/CtbSizeY)) bits.

The variable NumSubPicGridCols is derived as follows:

NumSubPicGridCols=(pic_width_max_in_luma_samples+subpic_grid_col_width_minus1*CtbSizeY+CtbSizeY−1)/(subpic_grid_col_width_minus1*CtbSizeY+CtbSizeY)

subpic_grid_row_height_minus1 plus 1 specifies the height of each element of the subpicture identifier grid excluding the bottom grid row of the picture in units of CTBs. The length of the syntax element is Ceil(Log 2(pic_height_max_in_luma_samples/CtbSizeY)) bits.

The variable NumSubPicGridRows is derived as follows:

NumSubPicGridRows=(pic_height_max_in_luma_samples+subpic_grid_row_height_minus1*CtbSizeY+CtbSizeY−1)/(subpic_grid_row_height_minus1*CtbSizeY+CtbSizeY)

The list CtbToSubPicIdx[ctbAddrRs] for ctbAddrRs ranging from 0 to PicSizeInCtbsY−1, inclusive, specifying the conversion from a CTB address in picture raster scan to a subpicture index, can be derived as follows:

```
for( ctbAddrRs = 0; ctbAddrRs < PicSizeInCtbsY; ctbAddrRs++ ) {
    posX = ctbAddrRs % PicWidthInCtbsY * CtbSizeY
    posY = ctbAddrRs / PicWidthInCtbsY * CtbSizeY
    CtbToSubPicIdx[ ctbAddrRs ] = −1
    for( i = 0; CtbToSubPicIdx[ ctbAddrRs ] < 0 && i < NumSubPics; i++ ) {
        if( ( posX >= SubPicLeft[ i ] * ( subpic_grid_col_width_minus1 + 1 ) *
            CtbSizeY ) &&
                ( posX < ( SubPicLeft[ i ] + SubPicWidth[ i ] ) *
                    ( subpic_grid_col_width_minus1 + 1 ) * CtbSizeY ) &&
                ( posY >= SubPicTop[ i ] *
                    ( subpic_grid_row_height_minus1 + 1 ) * CtbSizeY ) &&
                ( posY < ( SubPicTop[ i ]+ SubPicHeight[ i ] ) *
                    ( subpic_grid_row_height_minus1 + 1 ) * CtbSizeY ) )
            CtbToSubPicIdx[ ctbAddrRs ] = i
    }
}
```

It is noted that grid elements in the right-most grid column of a picture may be incomplete and a grid width may be smaller than (subpic_grid_row_width_minus1+1)*CtbSizeY samples. Grid elements in the bottom grid row of die picture may be incomplete and the grid height may be smaller than (subpic_grid_row_height_minus1+1)*CtbSizeY samples.

Example D: Signaling Subpicture Layout Based on Units of a CTB Size

In an embodiment, a width or a height of a subpicture partition grid is defined to be a CTU size. In addition, instead of signaling size information of grid elements and grid indices assigned to respective grid elements, positions and sizes of each subpicture are explicitly signaled based on the grid with the CTU size as a grid element size.

For example, coordinates of a top-left corner CTU in a subpicture based on the CTU-size-based grid can be signaled to indicate a position of the subpicture. A height and a weight of the subpicture in units of a CTU size can be signaled to convey the size information of the subpicture.

In the above Examples C and D, one advantage of using units of a CTU size as a basis for signaling subpicture partition information is that bits used for signaling the subpicture-related syntax elements can be saved compared with using units of 4 or 8 samples.

3. Associating Slices with Subpictures

Example E: Slice Association with Subpictures in PPS

As described, a subpicture can be defined to be a rectangular region that includes a set of slices. Accordingly, each slice can be associated with a subpicture. For example, each slice can be associated with a subpicture index in high level signaling (e.g., an SPS, or a picture parameter set (PPS)). Based on the high level signaling, a decoder can know a mapping relationship between the slices and the subpictures.

In an embodiment, subpicture partition information can be signaled in an SPS in a way similar to that of Table 1 or Table 2. At the same time, slice association with respective subpictures is signaled in a PPS shown in Table 3.

TABLE 3

| # | pic_parameter_set_rbsp( ) { | Descriptor |
|---|---|---|
| 1 | pps_pic_parameter_set_id | ue(v) |
| 2 | pps_seq_parameter_set_id | ue(v) |
| 3 | pic_width_in_luma_samples | ue(v) |
| 4 | pic_height_in_luma_samples | ue(v) |
| 5 | conformance_window_flag | u(1) |
| 6 | if( conformance_window_flag ) { | |
| 7 |     conf_win_left_offset | ue(v) |
| 8 |     conf_win_right_offset | ue(v) |
| 9 |     conf_win_top_offset | ue(v) |
| 10 |     conf_win_bottom_offset | ue(v) |
| 11 | } | |
| 12 | output_flag_present_flag | u(1) |
| 13 | single_tile_in_pic_flag | u(1) |
| 14 | if( !single_tile_in_pic_flag ) { | |
| 15 |     uniform_tile_spacing_flag | u(1) |
| 16 |     if( uniform_tile_spacing_flag ) { | |
| 17 |         tile_cols_width_minus1 | ue(v) |
| 18 |         tile_rows_height_minus1 | ue(v) |
| 19 |     } else { | |
| 20 |         num_tile_columns_minus1 | ue(v) |
| 21 |         num_tile_rows_minus1 | ue(v) |
| 22 |         for( i = 0; i < num_tile_columns_minus1; i++ ) | |
| 23 |             tile_column_width_minus1[ i ] | ue(v) |
| 24 |         for( i = 0; i < num_tile_rows_minus1; i++ ) | |
| 25 |             tile_row_height_minus1[ i ] | ue(v) |
| 26 |     } | |

TABLE 3-continued

| # | pic_parameter_set_rbsp( ) { | Descriptor |
|---|---|---|
| 27 | brick_splitting_present_flag | u(1) |
| 28 | if( uniform_tile_spacing_flag && brick_splitting_present_flag ) | |
| 29 | num_tiles_in_pic_minus1 | ue(v) |
| 30 | for( i = 0; brick_splitting_present_flag && i <= num_tiles_in_pic_minus1 + 1; i++ ) { | |
| 31 | if( RowHeight[ i ] > 1 ) | |
| 32 | brick_split_flag[ i ] | u(1) |
| 33 | if( brick_split_flag[ i ] ) { | |
| 34 | if( RowHeight[ i ] > 2 ) | |
| 35 | uniform_brick_spacing_flag[ i ] | u(1) |
| 36 | if( uniform_brick_spacing_flag[ i ] ) | |
| 37 | brick_height_minus1[ i ] | ue(v) |
| 38 | else { | |
| 39 | num_brick_rows_minus2[ i ] | ue(v) |
| 40 | for( j = 0; j <= num_brick_rows_minus2[ i ]; j++ ) | |
| 41 | brick_row_height_minus1[ i ][ j ] | ue(v) |
| 42 | } | |
| 43 | } | |
| 44 | } | |
| 45 | single_brick_per_slice_flag | u(1) |
| 46 | if( !single_brick_per_slice_flag ) | |
| 47 | rect_slice_flag | u(1) |
| 48 | if( rect_slice_flag && !single_brick_per_slice_flag ) { | |
| 49 | num_slice_in_pic_minus1 | ue(v) |
| 50 | bottom_right_brick_idx_length_minus1 | ue(v) |
| 51 | for( i = 0; i < num_slices_in_pic_minus1; i++ ) { | |
| 52 | bottom_right_brick_idx_delta[ i ] | u(v) |
| 53 | brick_idx_delta_sign_flag[ i ] | u(1) |
| 54 | } | |
| 55 | } | |
| 56 | loop_filter_across_bricks_enabled_flag | u(1) |
| 57 | if( loop_filter_across_bricks_enabled_flag ) | |
| 58 | loop_filter_across_slices_enabled_flag | u(1) |
| 59 | } | |
| 60 | if( rect_slice_flag ) { | |
| 61 | signalled_slice_id_flag | u(1) |
| 62 | if( signalled_slice_id_flag ) { | |
| 63 | signalled_slice_id_length_minus1 | ue(v) |
| 64 | for( i = 0; i <= num_slices_in_pic_minus1; i++ ) | |
| 65 | slice_id[ i ] | u(v) |
| 66 | } | |
| 67 | } | |
| 68 * | if( subpics_present_flag ) { | |
| 69 * | if( rect_slice_flag ) | |
| 70 * | for( i = 0; i <= num_slices_in_pic_minus1; i++ ) | |
| 71 * | subpic_id[ i ] | u(v) |
| 72 * | } | |
| 73 | | |
| 74 | ... | |
| 75 | slice_header_extension_present_flag | u(1) |
| 76 | pps_extension_flag | u(1) |
| 77 | if( pps_extension_flag ) | |
| 78 | while( more_rbsp_data( ) ) | |
| 79 | pps_extension_data_flag | u(1) |
| 80 | rbsp_trailing_bits( ) | |
| 81 | } | |

At rows 13-25, tile partition information is signaled. At rows 27-41, brick partition information is signaled. At rows 45-65, slice partition information is signaled. At rows 68-72, information of the slice association with the subpictures is signaled. Specifically, num_slices_in_pic_minus1 (signaled at row 49) plus 1 specifies the number of slices in each picture referring to the PPS of Table 3. The value of num_slices_in_pic_minus1 can be in the range of 0 to NumBricksInPic−1, inclusive. When num_slices_in_pic_minus1 is not present and single_brick_per_slice_flag is equal to 1, the value of num_slices_in_pic_minus1 is inferred to be equal to NumBricksInPic−1. When single_tile_in_pic_flag is equal to 1, the value of num_slices_in_pic_minus1 is inferred to be equal to 0. In other words, when there is a single tile in the picture, the number of slices in the picture would be 1.

subpic_id[i] at row 71 specifies the subpicture identifier (ID) to which the i-th slice belongs. The length of the subpic_id[i] syntax element is Ceil(Log 2(max_subpics_minus1+1)) bits. The value of subpic_id[i] is a mapping to the subpicture index specified in the SPS. The slices with the same subpicture ID collectively form the respective subpicture region.

In an embodiment, a subpicture ID is specified in a low level signaling (e.g., a slice header), and is associated with a non-rectangular slice. Table 4 shows such an example slice header signaling syntax elements in a slice of a picture.

TABLE 4

| # | slice_header( ) { | Descriptor |
|---|---|---|
| 1 | slice_pic_parameter_set_id | ue(v) |
| 2 * | if( subpics_present_flag && !rect_slice_flag) | |
| 3 * | subpic_id | u(v) |
| 4 | if( rect_slice_flag \|\| NumBricksInPic > 1 ) | |
| 5 | slice_address | u(v) |
| 6 | if( !rect_slice_flag && !single_brick_per_slice_flag ) | |
| 7 | num_bricks_in_slice_minus1 | ue(v) |
| 8 | non_reference_picture_flag | u(1) |
| 9 | slice_type | ue(v) |
| 10 | if( separate_colour_plane_flag = = 1 ) | |
| 11 | colour_plane_id | u(2) |
| 12 | slice_pic_order_cnt_lsb | u(v) |

In the example of Table 4, whether subpictures are present in the picture and whether the current slice is a rectangular slice are verified at row 2. When the subpictures are used, and the current slice is a non-rectangular slice, a syntax subpic_id is signaled. subpic_id specifies the subpicture ID to which the current slice belongs. The length of the subpic_id syntax element is Ceil(Log 2(max_subpics_minus1+1)) bits. The value of subpic_id is a mapping to the subpicture index specified in an SPS (e.g., signaled in Table 2). The slices with the same subpicture ID collectively form the subpicture region. In the Table 4 example, the subpictures can be formed by non-rectangular slices.

Example F: Signaling Subpicture Partition Based on a Slice Layout

As described in Example E, the information of slice association with the subpictures is specified in the PPS of Table 3 (e.g., at rows 70-71 in Table 3), and information of a layout of the slices also is indicated in the PPS of Table 3 (e.g., the tile and brick partition information at rows 13-41 and the slice information at rows 45-65). As each subpicture is a collection of slices, based on the signaled information in Table 3, subpicture partition information can be determined accordingly. Thus, in an embodiment, syntax elements related with subpicture partition can be removed from the SPS in Table 1 or Table 2. FIG. 10 shows the SPS in Table 1 that is modified to remove signaling of the syntax elements subpic_grid_col_width_minus1, subpic_grid_row_height_minus1, and subpic_grid_idx from the rows 16-20. As the variable NumSubPics is unavailable now due to the modification, row 21 is also modified. When the SPS in Table 2 is used, the SPS in Table 2 can be modified in a similar way as what is shown in FIG. 10.

In Example F, the PSS in Table 3 and the slice header in Table 4 can still be maintained.

As an example, variables SubPicTopLeftBrickIdx[subpic_id[i]], and SubPicBottomRightBrickIdx[subpic_id[i]], which specify the brick index of the brick located at the top left corner of the subpicture with subpic_id[i] and the brick index of the brick located at the bottom right corner of the subpicture with subpic_id[i], and a variable, NumSubPics indicating the number of subpictures, can be derived as follows when the rectangular slice is used:

```
rect_slice_flag is equal to 1
NumSubPics = 0
for( i = 0; i <= num_slices_in_pic_minus1; i++ ) {
    if ( i == 0)
        SubPicTopLeftBrickIdx[ subpic_id[ i ] ] = TopLeftBrickIdx[ i ]
    else if( subpic_id[ i ] != subpic_id[ i − 1 ] ) {
        SubPicTopLeftBrickIdx[ subpic_id[ i ] ] = TopLeftBrickIdx[ i ]
        SubPicBottomRightBrickIdx[ subpic_id[ i − 1 ] ] =
        BottomRightBrickIdx[ i − 1 ]
        NumSubPics++
    }
}
``` otherwise (rect_slice_flag is equal to 0)

SubPicTopLeftBrickIdx[subpic_id]=SliceBrickIdx[0]

SubPicBottomRightBrickIdx[subpic_id]=SliceBrickIdx[0]+num_bricks_in_slice_minus1

A process of determining indices and boundary positions of subpictures can be performed in the following way. The variables SubPicIdx, SubPicLeftBoundaryPos, SubPicTopBoundaryPos, SubPicRightBoundaryPos, and SubPicBotBoundaryPos are derived as follows:

```
SubPicIdx = CtbToSubPicIdx[ CtbAddrBsToRs[ FirstCtbAddrBs[
SliceBrickIdx[ 0 ] ] ] ]
if( subpic_treated_as_pic_flag[ SubPicIdx ] ) {
    brickIdx = SubPicTopLeftBrickIdx[ SubPicIdx ]
    SubPicLeftBoundaryPos = ( BrickColBd[ brickIdx ] − BrickWidth[
    brickIdx ] ) * CtbSizeY
    SubPicTopBoundaryPos = ( BrickRowBd[ brickIdx ] − BrickHeight[
    CbrickIdx ] ) * tbSizeY
    brickIdx = SubPicBottomRightBrickIdx[ SubPicIdx ]
    SubPicRightBoundryPos = BrickColBd[ brickIdx ] * CtbSizeY
    SubPicBotBoundryPos = BrickRowBd[ brickIdx ] * CtbSizeY
}
```

In Example F, using slice information for specifying subpictures may also automatically align subpicture size with a requirement that a picture size or a subpicture size is an integer multiples of 8 samples.

In another embodiment, as an alternative to Example F, the slice related information (e.g., including the tile, brick, and slice partition information and the related subpicture ID information) in the PPS in Table 3 can be moved into the modified SPS shown in FIG. 10, or the modified version of the SPS in Table 2 (modified in a way similar to that of FIG. 10).

Example G: Signaling Subpicture ID in Slice Header

In some examples, a subpicture ID for a current slice can be signaled in a slice header. In some examples, when a subpicture ID for a current slice is signaled in a slice header, no slice-subpicture association information is signaled in PPS or SPS (e.g., signaling of slice-subpicture association information in the PPS in Table 3 is not performed). In some other examples, subpicture IDs can be signaled in both slice header level and SPS or PPS level. Table 5 shows an example of a slice header where subpicture IDs are signaled at row 3 for a rectangular slice or a non-rectangular slice.

TABLE 5

| # | slice_header( ) { | Descriptor |
|---|---|---|
| 1 | slice_pic_parameter_set_id | ue(v) |
| 2 * | if( subpics_present_flag ) | |
| 3 * |    subpic_id | u(v) |
| 4 | } | |
| 5 | if( rect_slice_flag \|\| NumBricksInPic > 1 ) | |
| 6 |    slice_address | u(v) |
| 7 | if( !rect_slice_flag && !single_brick_per_slice_flag ) | |
| 8 |    num_bricks_in_slice_minus1 | ue(v) |
| 9 | non_reference_picture_flag | u(1) |
| 10 | slice_type | ue(v) |
| 11 | if( separate_colour_plane_flag = = 1 ) | |
| 12 |    colour_plane_id | u(2) |
| 13 | slice_pic_order_cnt_lsb | u(v) |
| 14 | ... | |

For the subpicture related techniques disclosed herein, video encoders can follow the foregoing syntax design so as to generate a valid bitstream, and video decoders are able to decode the bitstream correctly if a parsing process performed at the decoders is complied with the foregoing syntax design. When a syntax element is skipped in the bitstream, encoders and decoders should set the syntax value as an inferred value to guarantee respective encoding and decoding results are matched.

III. Example Decoding Process with Subpicture-Based Techniques

Figure 11:
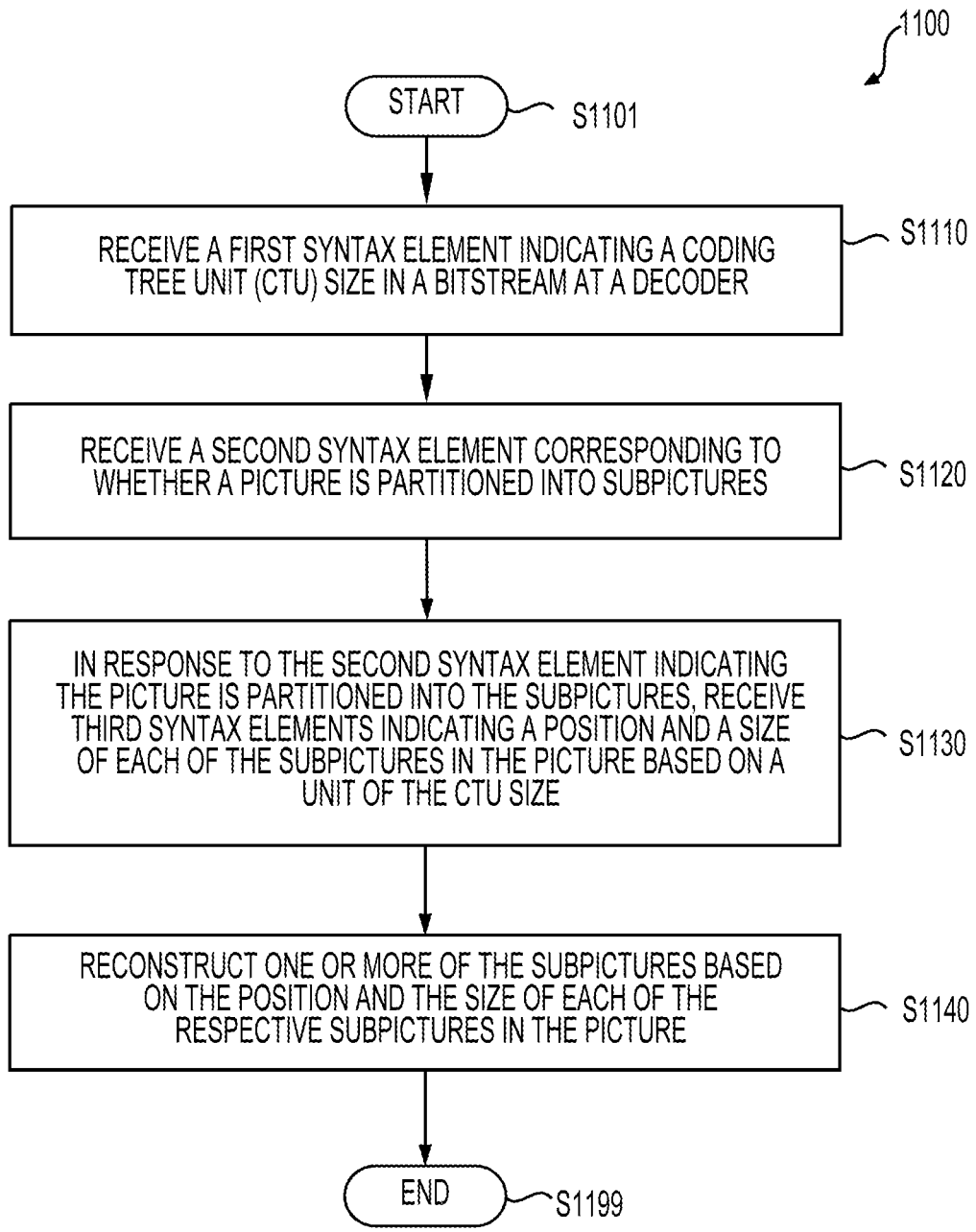
FIG. 11 shows a process 1100 for decoding a video sequence including subpictures at a decoder.

FIG. 11 shows a process 1100 for decoding a video sequence including subpictures at a decoder. For example, the process 1100 can be performed at the decoder 200 in FIG. 2 example. The subpicture partition module 240 in cooperation with the other modules of the decoder 200 can perform the process to decode the video sequence. The process 1100 can start from S1101, and proceed to S1110.

At S1110, a first syntax element indicating a CTU size can be received in a bitstream at the decoder. For example, a parsing process can be performed to obtain the first syntax element front the bitstream. The first syntax element can be signaled in an SPS or a PPS.

At S1120, a second syntax element indicating or corresponding to whether a picture is partitioned into subpictures can be received in the bit stream, for example, in an SPS or a PPS. For example, the second syntax element can be an SPS subpicture information present flag, denoted subpics_present_flag, sps_subpic_info_present_flag or any other syntax element. The syntax element sps_subpic_info_present_flag equal to 1 specifies that subpicture information is present for the video sequence and there might be one or more than one subpicture in each picture of the video sequence. The syntax element sps_subpic_info_present_flag equal to 0 specifies that subpicture information is not present for the video sequence and there is only one subpicture in each picture of the video sequence.

At S1130, in response to the second syntax element corresponding to the picture being partitioned into the subpictures, a set of third syntax elements indicating a position and a size of each of the subpictures in the picture based on a unit of the CTU size can be received. For example, the third syntax elements can include syntax elements indicating a height and a width of grid elements, and subpicture grid indices associated with the grid elements as included in the SPS in Table 2. Based on those third syntax elements and the CTU size, positions and sizes of the respective subpictures can be derived.

Or, the third syntax elements can explicitly specify positions and sizes of the subpictures based on a grid defined in units of a CTU size (e.g., an element grid size equals a CTU size). Or, the third syntax elements can be syntax elements indicating partition information of bricks, tiles, and slices, and subpicture IDs associated with the slices as included in the PPS in Table 3. In this case, slice association with the subpictures is used to determine the positions and sizes of the subpictures.

At S1140, one or more of the subpictures can be reconstructed based on the position and the size of each of the respective subpictures in the picture. In an example, a subset of all subpictures can be decoded as indicated by control information obtained from the bitstream. Accordingly, syntax elements associated with the subset of all subpictures (or the slices of the subset of all subpictures) can be extracted or parsed from the bitstream. Each of the subset of all subpictures can be treated independently and accordingly decoded. In another example, all the subpictures can be extracted and decoded independently or interdependently. The process 1100 can proceed to S1199, and terminate at S1199.

IV. Computer Readable Medium

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
receiving a first syntax element indicating a coding tree unit (CTU) size in a bitstream at a decoder;
receiving a second syntax element corresponding to whether a picture is partitioned into subpictures, the second syntax element corresponding to whether the picture is partitioned into the subpictures being signaled in a sequence parameter set (SPS) in the bitstream, each subpicture containing one or more slices partitioned from the picture;
in response to the second syntax element corresponding to the picture being partitioned into the subpictures, receiving third syntax elements indicating a position and a size of each of the subpictures in the picture based on a unit of the CTU size, the third syntax elements indicating the position and the size of each of the subpictures being signaled in the SPS in the bitstream; and
reconstructing one or more of the subpictures based on the position and the size of each of the respective subpictures in the picture.

2. The method of claim 1, wherein the first or second syntax element is included in the SPS or a picture parameter set (PPS).

3. The method of claim 1, wherein the third syntax elements include subpicture indices associated with respective grid elements of a grid partitioning the picture, the grid elements associated with a same index of the subpicture indices collectively forming one of the subpictures, a size of the grid elements being specified with a unit of the CTU size or a unit of 8 samples.

4. The method of claim 1, further comprising:
receiving a fourth syntax element in a slice header of one of the one or more slices in the picture, the fourth syntax element indicating a subpicture identifier (ID) of one of the subpictures that contains the one of the one or more slices in the picture, the subpicture ID indicating that the one of the one or more slices in the picture belongs to the one of the subpictures.

5. The method of claim 1, further comprising:
receiving a flag indicating whether the picture includes a single tile in a PPS or the SPS; and
in response to the picture including the single tile, determining the picture includes a single slice.

6. The method of claim 1, further comprising:
for each slice in the picture, receiving a subpicture ID associated with each slice in a PPS or the SPS.

7. The method of claim 1, wherein the receiving the third syntax elements includes:
receiving syntax elements indicating a layout of the one or more slices in the picture;
receiving a subpicture ID for each of the one or more slices in the picture; and
determining the position, the size, or a subpicture ID of each of the subpictures in the picture based on the received syntax elements indicating the layout of the one or more slices in the picture and the received subpicture ID for each of the one or more slices in the picture.

8. The method of claim 7, wherein the syntax elements indicating the layout of the one or more slices in the picture, or the subpicture ID for each of the one or more slices in the picture are received in the SPS or a PPS.

9. An apparatus, comprising circuitry configured to:
receive a first syntax element indicating a coding tree unit (CTU) size in a bitstream at a decoder;
receive a second syntax element corresponding to whether a picture is partitioned into subpictures, the second syntax element corresponding to whether the picture is partitioned into the subpictures being signaled in a sequence parameter set (SPS) in the bitstream, each subpicture containing one or more slices partitioned from the picture;
in response to the second syntax element corresponding to the picture being partitioned into the subpictures, receive third syntax elements indicating a position and a size of each of the subpictures in the picture based on a unit of the CTU size, the third syntax elements indicating the position and the size of each of the subpictures being signaled in the SPS in the bitstream; and
reconstruct one or more of the subpictures based on the position and the size of each of the respective subpictures in the picture.

10. The apparatus of claim 9, wherein the first or second syntax element is included in the SPS or a picture parameter set (PPS).

11. The apparatus of claim 9, wherein the third syntax elements include subpicture indices associated with respective grid elements of a grid partitioning the picture, the grid elements associated with a same index of the subpicture indices collectively forming one of the subpictures, a size of the grid elements being specified with a unit of the CTU size or a unit of 8 samples.

12. The apparatus of claim 9, wherein the circuitry is further configured to:
receive a fourth syntax element in a slice header of one of the one or more slices in the picture, the fourth syntax element indicating a subpicture identifier (ID) of one of the subpictures that contains the one of the one or more slices in the picture, the subpicture ID indicating that the one of the one or more slices in the picture belongs to the one of the subpictures.

13. The apparatus of claim 9, wherein the circuitry is further configured to:
receive a flag indicating whether the picture includes a single tile in a PPS or the SPS; and
in response to the picture including the single tile, determine the picture includes a single slice.

14. The apparatus of claim 9, wherein the circuitry is further configured to:
for each slice in the picture, receive a subpicture ID associated with each slice in a PPS or the SPS.

15. The apparatus of claim 9, wherein the circuitry is further configured to:
receive syntax elements indicating a layout of the one or more slices in the picture;
receive a subpicture ID for each of the one or more slices in the picture; and
determine the position, the size, or a subpicture ID of each of the subpictures in the picture based on the received syntax elements indicating the layout of the one or more slices in the picture and the received subpicture ID for each of the one or more slices in the picture.

16. The apparatus of claim 15, wherein the syntax elements indicating the layout of the one or more slices in the picture, or the subpicture ID for each of the one or more slices in the picture are signaled in the SPS or a PPS.

17. A non-transitory computer-readable medium storing instructions that, when executed by a processor, cause the processor to perform a method, the method comprising:
 receiving a first syntax element indicating a coding tree unit (CTU) size in a bitstream at a decoder;
 receiving a second syntax element corresponding to whether a picture is partitioned into subpictures, the second syntax element corresponding to whether the picture is partitioned into the subpictures being signaled in a sequence parameter set (SPS) in the bitstream, each subpicture containing one or more slices partitioned from the picture;
 in response to the second syntax element corresponding to the picture being partitioned into the subpictures, receiving third syntax elements indicating a position and a size of each of the subpictures in the picture based on a unit of the CTU size, the third syntax elements indicating the position and the size of each of the subpictures being signaled in the SPS in the bitstream; and
 reconstructing one or more of the subpictures based on the position and the size of each of the respective subpictures in the picture.

18. The non-transitory computer-readable medium of claim 17, wherein the first or second syntax element is included in the SPS or a picture parameter set (PPS).

19. The non-transitory computer-readable medium of claim 17, wherein the third syntax elements include subpicture indices associated with respective grid elements of a grid partitioning the picture, the grid elements associated with a same index of the subpicture indices collectively forming one of the subpictures, a size of the grid elements being specified with a unit of the CTU size or a unit of 8 samples.

20. The non-transitory computer-readable medium of claim 17, wherein the method further comprises:
 receiving a fourth syntax element in a slice header of one of the one or more slices in the picture, the fourth syntax indicating a subpicture identifier (ID) of one of the subpictures that contains the one of the one or more slices in the picture, the subpicture ID indicating that the one of the one or more slices in the picture belongs to the one of the subpictures.

* * * * *